United States Patent
Walsh et al.

(10) Patent No.: US 6,633,746 B1
(45) Date of Patent: Oct. 14, 2003

(54) PAGER WITH A TOUCH-SENSITIVE DISPLAY SCREEN AND METHOD FOR TRANSMITTING A MESSAGE THEREFROM

(75) Inventors: Patrick Jay Walsh, Bloomingdale, IL (US); Theodore James Myers, East Dundee, IL (US)

(73) Assignee: SBC Properties, L.P., Reno, NV (US)

( * ) Notice: Subject to any disclaimer, the term of this patent is extended or adjusted under 35 U.S.C. 154(b) by 0 days.

(21) Appl. No.: 09/192,908

(22) Filed: Nov. 16, 1998

(51) Int. Cl.[7] ................................................. H04B 1/38
(52) U.S. Cl. ...................... 455/31.3; 455/575; 340/7.2; 340/7.55; 345/173
(58) Field of Search ................................ 455/31.1, 31.2, 455/31.3, 566, 38.4, 550, 575, 517; 345/173, 174, 175, 176, 177; 340/825.26, 7.2, 7.21, 7.22, 7.55

(56) References Cited

U.S. PATENT DOCUMENTS

| | | |
|---|---|---|
| 4,653,086 A | 3/1987 | Laube |
| 4,794,634 A | 12/1988 | Torihata et al. |
| 4,911,536 A | 3/1990 | Ditzik |
| 4,969,180 A | 11/1990 | Watterson et al. |
| 5,157,717 A | 10/1992 | Hitchcock |
| 5,168,553 A | 12/1992 | Okazaki et al. |
| 5,249,220 A | 9/1993 | Moskowitz et al. |
| RE34,476 E | 12/1993 | Norwood |
| 5,276,794 A | 1/1994 | Lamb, Jr. |
| 5,301,222 A | 4/1994 | Fujiwara |
| 5,303,312 A | 4/1994 | Comerford et al. |
| 5,392,447 A | 2/1995 | Schlack et al. |
| 5,486,847 A | 1/1996 | Ranf et al. |
| 5,508,713 A | 4/1996 | Okouchi |
| 5,521,986 A | 5/1996 | Curtin, II et al. |
| 5,546,538 A | 8/1996 | Cobbley et al. |
| 5,561,446 A | 10/1996 | Montlick |
| 5,623,559 A | 4/1997 | Okouchi |
| 5,630,207 A | * 5/1997 | Gitlin et al. ................ 455/38.4 |
| 5,644,339 A | * 7/1997 | Mori et al. .................. 340/706 |
| 5,644,628 A | * 7/1997 | Schwarzer et al. ......... 345/173 |
| 5,684,873 A | * 11/1997 | Tiilikainen .................. 455/31.3 |

(List continued on next page.)

FOREIGN PATENT DOCUMENTS

JP  07298328 A  * 11/1995  ................ 455/31.3

OTHER PUBLICATIONS

Spyglass Device Mosaic 3.1; 1 page; http://www.spyglass.com.solutions.technologies/devicemosaic/ (Nov. 13, 1998).

(List continued on next page.)

Primary Examiner—Edward F. Urban
Assistant Examiner—Simon Nguyen
(74) Attorney, Agent, or Firm—Brinks Hofer Gilson & Lione

(57) ABSTRACT

An improved pager with a touch-sensitive display screen and method for transmitting a message therefrom is provided. Inputting a message onto the touch-sensitive display screen greatly facilitates sending a message from the pager and is more versatile than using navigation or soft keys to transmit built-in messages or using a small keyboard to type in messages. The pager of the preferred embodiments is operative to convert the inputted symbols into a text message and transmit the text message to a paging network. Because the pager transmits the content represented by the inputted symbols, the pager of the preferred embodiments is more versatile than pagers using ink-based systems, which merely transmit the image of the inputted symbol. If the pager is equipped with a browser application, the message from the pager can take the form of a request to a server located in a telecommunication network.

14 Claims, 4 Drawing Sheets

U.S. PATENT DOCUMENTS

| | | | | | |
|---|---|---|---|---|---|
| 5,751,693 | A | * | 5/1998 | Dinkins | 455/38.4 |
| 5,809,415 | A | * | 9/1998 | Rossmann | 455/422 |
| 5,835,577 | A | * | 11/1998 | Disanto et al. | 455/31.3 |
| 5,870,549 | A | * | 2/1999 | Bobo, II | 395/200.36 |
| 5,974,447 | A | * | 10/1999 | Cannon et al. | 340/825.44 |
| 6,011,554 | A | * | 1/2000 | King et al. | 345/352 |
| 6,014,552 | A | * | 1/2000 | Aiken et al. | 455/90 |
| 6,021,336 | A | * | 2/2000 | Kunihiro et al. | 455/31.3 |
| 6,040,784 | A | * | 3/2000 | Miller | 340/825.44 |
| 6,415,138 | B2 | * | 7/2002 | Sirola et al. | 455/90 |

OTHER PUBLICATIONS

How Spyglass Prism 2.0 Works; 1 page; http://www.spyglass.com/solutions/technologies/prism/howworks.html (Nov. 13, 1998).

Spyglass Prism 2.0—Optimizing Web Content for Faster Display on Non–PC Devices; 1 page; http://www.spyglass.com/solutions/technologies/prism/ (Nov. 13, 1998).

Spyglass Remote Mosaic—Detailed Information; 3 pages; http://www.spyglass.com/solutions/technologies/remotemosaic/details.html (Nov. 13, 1998).

Spyglass Prism 2.0 Sample Applications; 2 pages; http://www.spyglass.com/solutions/technologies/prism/applications.html (Nov. 13, 1998).

Try it out; 1 page; http://www.uplanet.com/tech/try.html (Aug. 23, 1998).

UP.Link Platform v. 2.0; 3 pages; http://www.uplanet.com/tech/tech_overview.html (Aug. 23, 1998).

Motorola To Incorporate T9 Text Input Into Its Wireless Handsets; 3 pages (Aug. 3, 1998).

Graffiti: Handwriting Recognition for PDA's 1 page; http://www.wohl.com/g0044.htm (11/94).

New Handset Combines Phone, Palm Computing; 1 page; http://www.commnow.com/protectwn/action.lasso?–database=wireless.fp3&art (Sep. 21, 1998).

Introducing the pdQ smartphone; 2 pages; http://www.qualcomm.com/pdQ/index.html (Oct. 2, 1998).

Here's more . . . ; 3 pages; http://www.qualcomm.com/pdQ/benefits.html (Oct. 2, 1998).

* cited by examiner

PAGER WITH A TOUCH-SENSITIVE DISPLAY SCREEN AND METHOD FOR TRANSMITTING A MESSAGE THEREFROM

TECHNICAL FIELD

The present invention relates generally to transmitting messages, such as a text message or a browser request, from a pager with a touch-sensitive display screen.

BACKGROUND

Cellular and paging networks can send information to cellular telephones and pagers, respectively. To send information to a cellular telephone, a cellular network uses multiple radio-frequency channels for real-time voice or data transmission. The cellular network can also use a store-and-forward messaging service known as Short-Message Service to forward messages from one channel of a cell site. To send information to a pager, a paging network uses a single, shared radio-frequency channel and a store-and-forward system to schedule message delivery over the shared channel. Two-way pagers typically operate on the 901–902, 930–931, and 940–941 MHz range.

Although both cellular telephones and pagers can be used to transmit information, cellular telephones are much more versatile. With a cellular telephone, a user can input voice information by speaking into the telephone and can input data information by using the telephone keypad to type alpha-numeric characters. To transmit a message from a pager, a user is often limited to manipulating navigation keys (e.g., up and down arrows) or buttons corresponding to displayed soft keys to transmit built-in messages. Because the user's response is confined to built-in messages, two-way data communication using a pager is limited. Although some pagers have a keyboard to enable two-way data communication, some users may find the small keyboard difficult to use.

U.S. Pat. No. 5,751,693 to Dinkins offers one attempt to overcome the limitations associated with data transmission from a pager. A two-way messaging system is described at col. 7, lines 11–31 of the Dinkins patent in which a stylus is used to draw a message onto a data entry and display screen of a transmitting pager, and the drawn message is displayed on a receiving pager. The messaging system described in the Dinkins patent is an "ink-based" system—the written message or drawing transmitted to the receiving pager is essentially a duplicate of the message entered onto the screen of the transmitting pager. Because an image and not the content represented by the image is transmitted, ink-based systems are of limited use.

There is, therefore, a need for an improved pager with a touch-sensitive display screen and method for transmitting a message therefrom.

DETAILED DESCRIPTION OF THE PRESENTLY PREFERRED EMBODIMENTS

Figure 1:
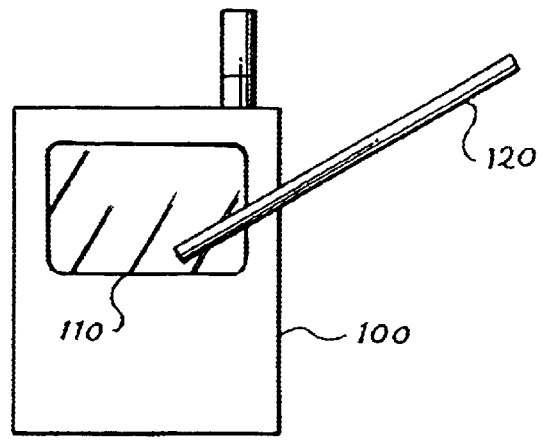
FIG. 1 is an illustration of a pager of a presently preferred embodiment.

By way of introduction, the preferred embodiments described below include a pager 100 with a touch-sensitive display screen 110 (FIG. 1) and a method for transmitting a message therefrom. Inputting a message onto the touch-sensitive display screen 110 using a stylus 120, for example, greatly facilitates sending a message from the pager 100 and is more versatile than using navigation or soft keys to transmit built-in messages or using a small keyboard to type in messages. The pager 100 of the preferred embodiments is operative to convert inputted symbols into a text message and transmit the text message to a paging network. Because the pager 100 transmits the content represented by the inputted symbols, the pager 100 of the preferred embodiments is more versatile than pagers using ink-based systems, which merely transmit the image of the inputted symbol. If the pager 100 is equipped with a browser application, the message from the pager 100 can take the form of a request to a server located in a telecommunication network.

Figure 2:
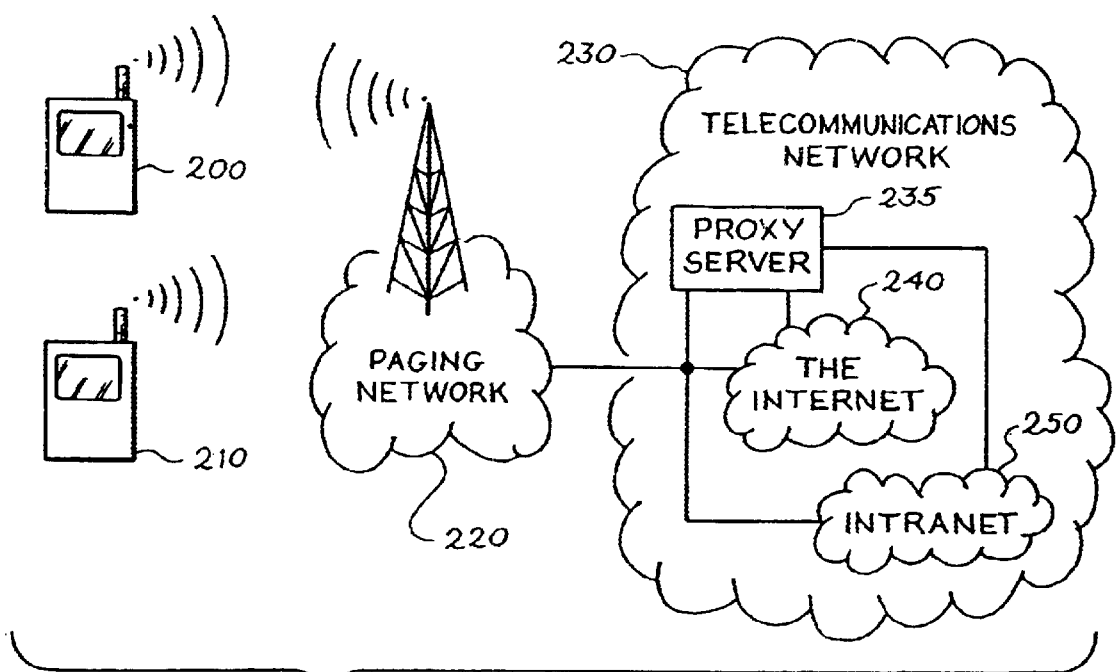
FIG. 2 is a block diagram of a telecommunications environment of a presently preferred embodiment.

Turning again to the drawings, FIG. 2 is an illustration of a telecommunications environment of a preferred embodiment. As shown in FIG. 2, this environment comprises first and second pagers 200, 210 in wireless communication with a paging network 220. The paging network 220 is coupled with a telecommunications network 230, which can comprise a proxy server 235, the Internet 240, and an intranet 250. As used herein, the term "telecommunications network" broadly refers to any data and/or voice network, including packet and/or switch-based networks.

Figure 3:
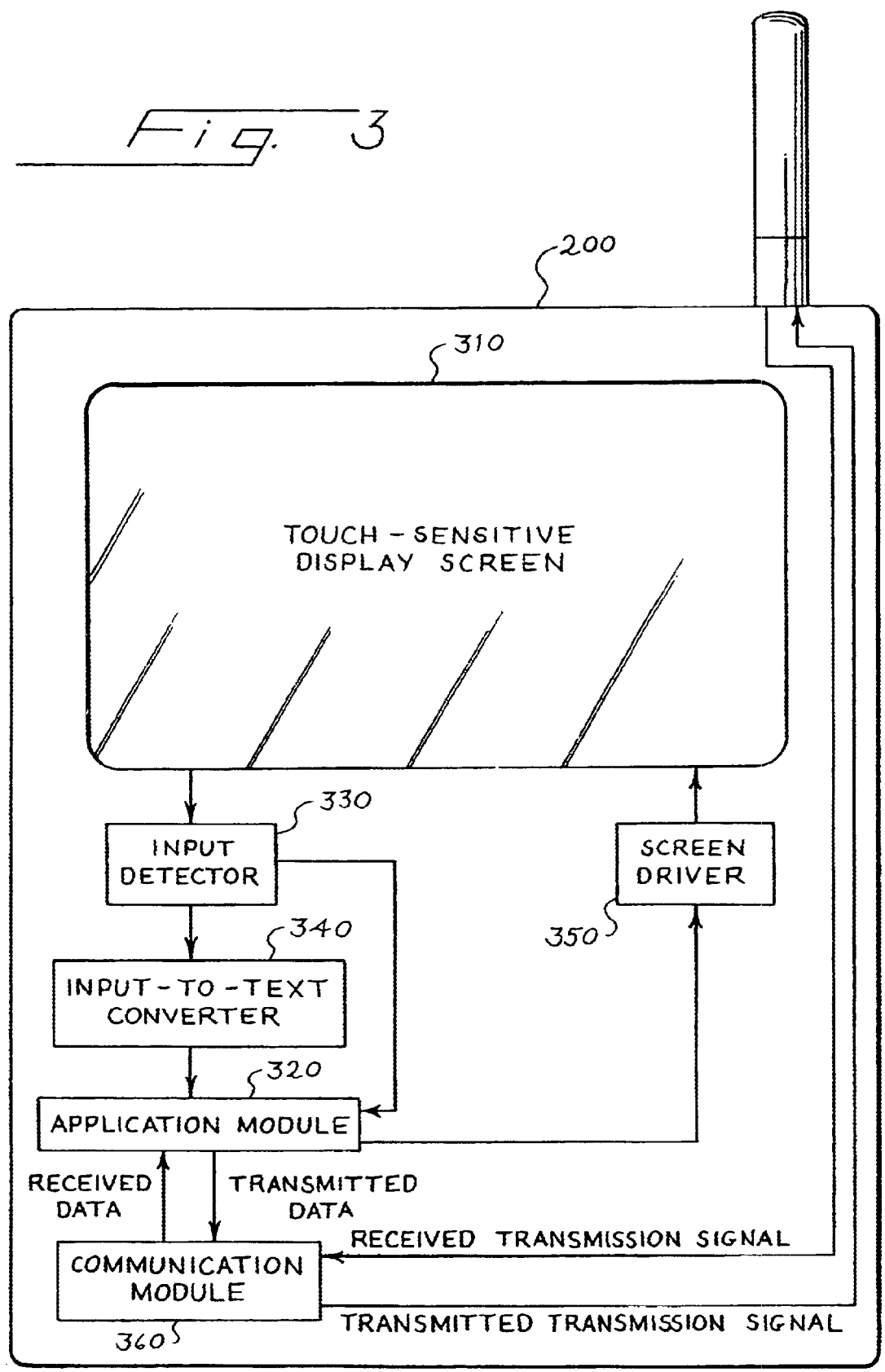
FIG. 3 is a block diagram showing a preferred implementation of a pager.

FIG. 3 is a block diagram of a preferred implementation of the first pager 200 of FIG. 2. As shown in FIG. 3, the first pager 200 comprises a touch-sensitive display screen 310 coupled with an application module 320 through an input detector 330 and an input-to-text converter 340 or through the input detector 330 alone. A screen driver 350 also couples the application module 320 with the touch-sensitive display screen 310. Lastly, a communication module 360 is coupled with the application module 320 to transmit and receive data sent to and from the application module 320 and transmit and receive transmission signals sent from and to the pager 200. As used herein, the term "coupled with" means directly coupled with or indirectly coupled with through one or more components. The first pager 200 can comprise additional components. Many, if not all, of these additional components may depend on the specific pager used and, thus, are not shown in FIG. 3.

The following two examples will illustrate the operation of the telecommunications environment of FIG. 2 and the block diagram of the first pager 200 of FIG. 3. In the first example, the application module 320 comprises a text messaging application, and the transmitted message comprises a text message. In the second example, the application module 320 comprises a browser application, and the transmitted message comprises a request from the browser application to a server located in the telecommunications network 230. Although two examples will be described below, it should be understood that the first pager 200 can be operative to perform other functions. For example, the stylus and touch-sensitive display screen can be used to select one of several available application functions.

Figure 4:
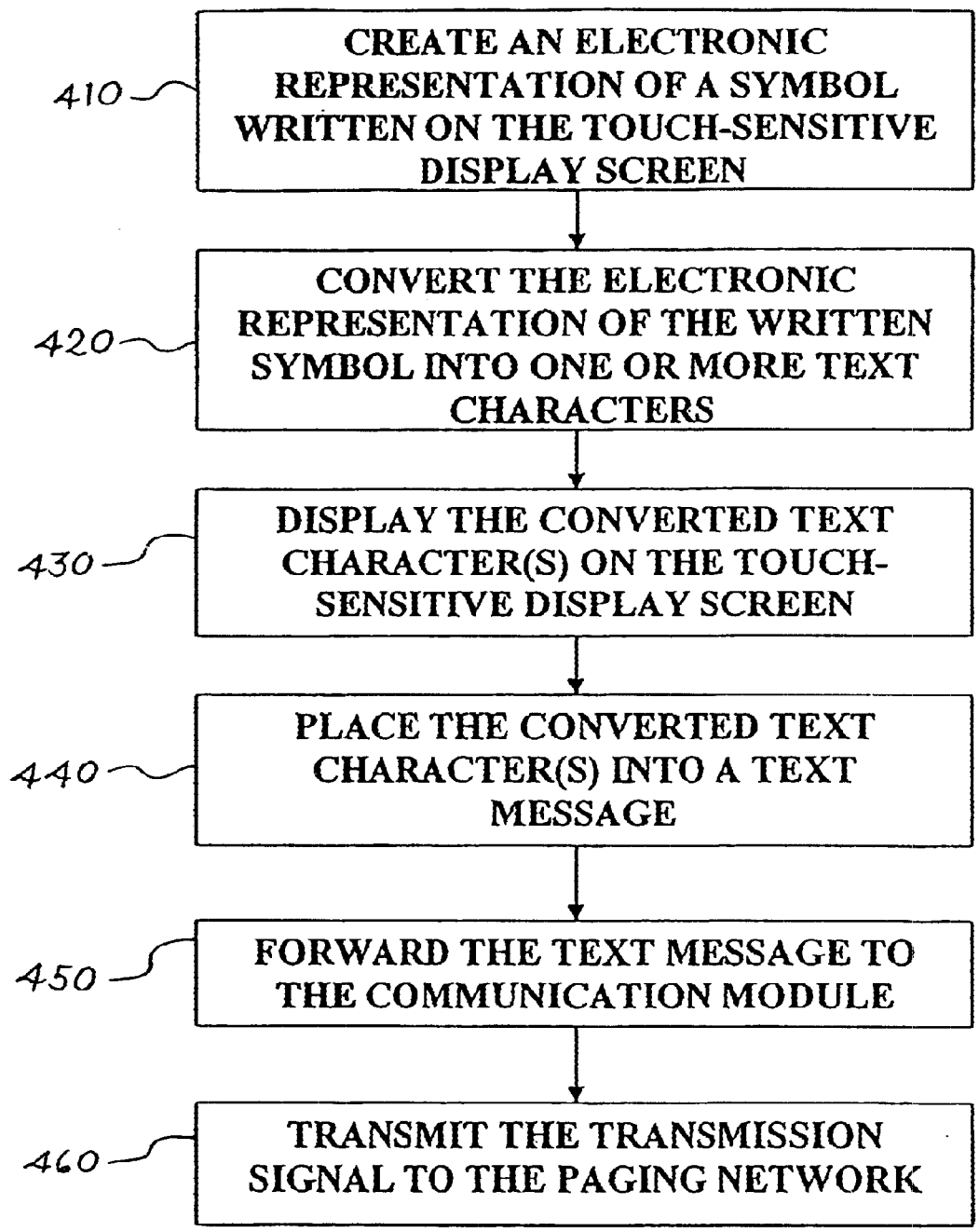
FIG. 4 is a flow chart of a preferred method for transmitting a text message from a pager.

The first example will be illustrated in reference to FIG. 4, which is a flow chart of a preferred method for transmitting a text message from the first pager 200. Using a stylus, a user writes a symbol on the touch-sensitive display screen 310, and the input detector 330 creates an electronic representation of the written symbol (step 410). Next, the input-to-text converter 340 converts the electronic representation of the written symbol into one or more text characters (step 420). For example, the input-to-text converter 340 can convert an entered symbol into a single alphanumeric character or can convert the symbol into a word or phrase.

The converted text character(s) are then transferred to the application module 320 (i.e., the messaging application), which instructs the screen driver 350 to display the converted text character(s) on the touch-sensitive display screen 310 (step 430). The messaging application also places the converted text character(s) into a text message (step 440) and then forwards the text message to the communication module 360 (step 450). The text message can be created and forwarded as each converted text character is received by the application module 320 or after the user indicates that his message is complete. Upon receipt, the communication module 360 converts the text message into a transmission signal and transmits the transmission signal to the paging network 220 (step 460). The paging network 220 can transfer the transmission signal to the second pager 210 for two-way data transmission or can transfer the transmission signal to the Internet 240 or the intranet 250 in the telecommunications network 230, which can deliver the message to a computer linked to the telecommunications network 230.

In addition to sending messages, the first pager 200 can also receive messages via the paging network 220 from, for example, the second pager 210, the Internet 240, or the intranet 250. When an incoming transmission signal is received, the communication module 360 converts the signal and transfers the received data to the application module 320, which then instructs the screen driver 350 to display the message in the appropriate form on the touch-sensitive display screen 310.

Figure 5:
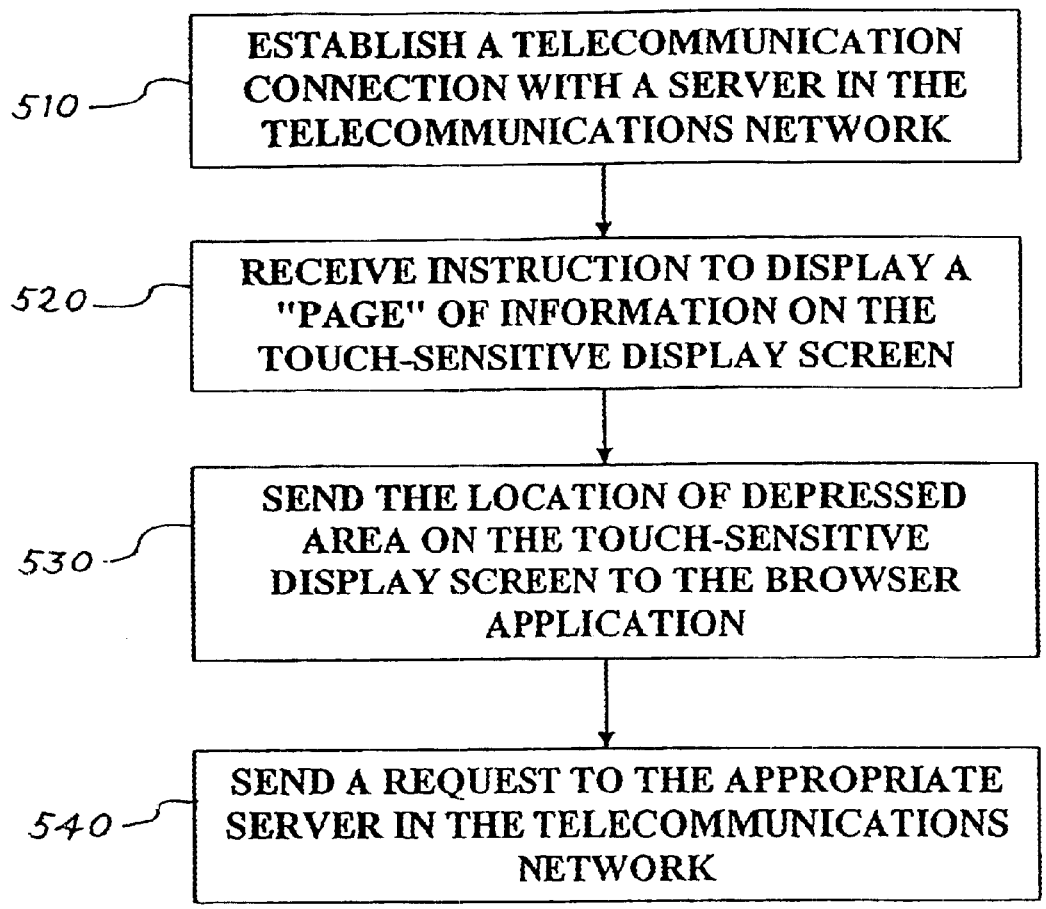
FIG. 5 is a flow chart of a preferred method for transmitting a request from a browser application in a pager to a server located in a telecommunications network.

In the second example, the application module 320 comprises a browser application, and the transmitted message comprises a request from the browser application to a server in the telecommunications network 230. FIG. 5 is a flow chart of a method of transmitting a request from a browser application in the first pager 200 to a server located in a telecommunications network 230. First, the browser application establishes a (real or virtual) telecommunication connection with a server in the telecommunications network 230 (step 510). The server then instructs the first pager 200 to display a "page" of information on the touch-sensitive display screen 310 (step 520). This page contains at least one display region associated with a request. When the user depresses the display region on the touch-sensitive display screen 310, the input detector 330 sends the location of the depressed area to the browser application (step 530), which determines that the user selected the display region. The browser application then sends a request, via the communication module 360, to the appropriate server in the telecommunications network 230 (step 540). The browser application can be a Web browser, and the display region can be a Universal Resource Locator ("URL") link. Selection of the link on the touch-sensitive display screen 310 causes the Web browser to send a request for a connection to the Web server associated with the selected URL. Because of the memory and computing limitations associated with a pager, it is preferred that the browser application be a thin device-based browser, such as Spyglass Device Mosaic.

Although the input-to-text converter 340 was described above in regard to the message application, the input-to-text converter 340 can also be used with the browser application. The following example illustrates this combination in the context of a stock-quote retrieval application. Using the stylus, the user activates the Web browser application in the first pager 200. The browser application then displays a default Web page via the screen driver 350. When the user selects the URL of a stock quoting service, the URL request is sent to the selected Web server. A Web page (i.e., the response to the request) is then returned to the application and displayed on the touch-sensitive display screen 310. The displayed Web page contains a prompt for the company name or abbreviation to be entered. Using the stylus, the user writes the symbols on the touch-sensitive display screen 310. The input-to-text converter 340 converts the symbols into text characters, which are then displayed. When the user enters the last symbol, he selects an enter prompt with the stylus. The application then sends the request to the server hosting the stock quoting service, which returns the stock quote for display on the touch-sensitive display screen 310.

Hypertext markup language ("HTML") is often used to deliver content from hypertext transport protocol ("HTTP") servers to Web browsers. HTML, however, does not scale well to small displays and mouseless user interfaces and has difficulty delivering information to handheld devices with size, memory and cost constraints. To overcome these difficulties, it is preferred that a proxy server 235 translate the content from a server to a format that matches the relatively limited display capabilities of the pager. A proxy server 235, such as Spyglass Prism 2.0, can convert memory and bandwidth-intensive color images into a simpler, gray-scale format and resize the images for the pager's smaller display screen. Additionally, the proxy server 235 can extract certain elements from a page and place them on a template that the pager can easily display. In another preferred approach, a handheld device markup language ("HDML") is used in conjunction with a handheld device transport protocol ("HDTP") in lieu of HTML and HTTP. HDML is a language specification optimized for wireless Internet access from devices with small displays and mouseless interfaces, and HDTP is a protocol specification that enables paging networks to provide Internet access from standard handheld devices.

It is preferred that the touch-sensitive display screen 310 be a liquid crystal display ("LCD") screen. It is also preferred that the input-to-text converter 340 have notational language capability, preferably Graffiti by 3Com. Alternatively, the input-to-text converter 340 can be equipped with handwriting recognition functionality, such as Print Recognition from Apple Computers or Natural Handwriting Recognition from Parascript. It is also preferred that the communication module 360 use the Motorola Flex Protocol Family for accessing the paging network 220 and TCP/IP protocols for data communication. Additionally, it is preferred that an IP mobility manager, such as RFC 2002, be used to allow the first pager to use a fixed or dynamic IP address while moving across 1P network boundaries, thereby providing the appearance of a seamless network to the applications.

Also for simplicity, the terms "application module", "input detector", "input-to-text converter", "screen driver", and "communication module" are used in the specification and claims to broadly refer to hardware and/or software that can be used to perform the functions described above. It is important to note that any appropriate software language and any appropriate hardware, analog or digital, now in existence or later developed, can be used. A computer-usable medium having computer readable program code embodied therein can be used to perform the functions described above, and the functions described above can alternatively be implemented exclusively with hardware. Additionally, the functionality associated with each element can be combined with or distributed to other elements. Also, some of the elements described above may not be needed in all embodiments.

It is intended that the foregoing detailed description be understood as an illustration of selected forms that the invention can take and not as a definition of the invention. It is only the following claims, including all equivalents, that are intended to define the scope of this invention.

What is claimed is:

1. A pager comprising:
   a touch-sensitive display screen;
   an input detector coupled with the touch-sensitive display screen and operative to detect a symbol written on the touch-sensitive display screen;
   an input-to-text converter coupled with the input detector and operative to convert the detected symbol into a text character;
   an application module coupled with the input-to-text converter and operative to create a text message comprising the text character; and
   a communication module coupled with the application module and operative to transmit the text message from the pager;
   wherein the application module comprises a browser application.

2. The invention of claim 1, wherein the browser application comprises a thin device-based browser.

3. A pager comprising:
   a touch-sensitive display screen operative to receive a written symbol;
   an input-to-text converter coupled with the touch-sensitive display screen and operative to convert the written symbol into a text character;
   an application module coupled with the input-to-text converter, the application module comprising a browser application; and
   a communication module coupled with the input-to-text converter and operative to transmit a text message comprising at least the converted character from the pager.

4. The invention of claim 3 wherein the input-to-text converter comprises a handwriting recognition module.

5. The invention of claim 3 wherein the input-to-text converter comprises a notational language module.

6. The invention of claim 3, wherein the browser application comprises a thin device-based browser.

7. A pager comprising:
   a touch-sensitive display screen;
   first means for receiving a symbol written on the touch-sensitive display screen;
   second means for converting the received symbol into a text character;
   third means for transmitting a text message from the pager, the text message comprising at least the converted text character; and
   a browser application.

8. The invention of claim 7, wherein the browser application comprises a thin device-based browser.

9. A method for transmitting a text message from a pager comprising a touch-sensitive display screen, the method comprising:
   (a) receiving a symbol written on a touch-sensitive display screen of a pager;
   (b) converting the received symbol into a text character; and
   (c) with a browser application on the pager, transmitting a text message from the pager, the text message comprising at least the text character converted in (b).

10. The method of claim 9, wherein (c) comprises transmitting a text message from the pager to a second pager, the text message comprising at least the text character converted in (b).

11. The method of claim 9, wherein (c) comprises transmitting a text message from the pager to a server in a telecommunications network, the text message comprising at least the text character converted in (b).

12. The invention of claim 9, wherein the browser application comprises a thin device-based browser.

13. A method for transmitting a request from a pager to a server in wireless communication with the pager, the method comprising:
   (a) displaying a display region on a touch-sensitive display screen of a pager;
   (b) receiving a signal indicating selection of the display region on the touch-sensitive display screen;
   (c) with a browser application, transmitting a request associated with the selected display region from the pager to a server in wireless communication with the pager;
   (d) receiving a symbol written on the touch-sensitive display screen of the pager;
   (e) converting the received symbol into a text character; and
   (f) transmitting a text message from the pager to the server, the text message comprising at least the text character converted in (e).

14. A method for transmitting a request from a pager to a Web server in wireless communication with the pager, the method comprising:
   (a) with a browser application on a pager, displaying a Universal Resource Locator link on a touch-sensitive display screen of the pager;
   (b) receiving a signal indicating selection of the Universal Resource Locator link on the touch-sensitive display screen;
   (c) transmitting a request from the pager to a Web server associated with the selected Universal Resource Locator link;
   (d) receiving a symbol written on the touch-sensitive display screen of the pager;
   (e) converting the received symbol into a text character; and
   (f) transmitting a text message from the pager to the server, the text message comprising at least the text character converted in (e).

* * * * *

UNITED STATES PATENT AND TRADEMARK OFFICE
CERTIFICATE OF CORRECTION

PATENT NO. : 6,633,746 B1
DATED : October 14, 2003
INVENTOR(S) : Patrick J. Walsh et al.

It is certified that error appears in the above-identified patent and that said Letters Patent is hereby corrected as shown below:

<u>Title page,</u>
Item [56], References Cited, OTHER PUBLICATIONS, delete
"com.solutions.technologies" and substitute -- com/solutions/technologies -- in its place.

<u>Column 5,</u>
Lines 11 and 46, delete "claim 3" and substitute -- claim 1 or 3 -- in its place.

Signed and Sealed this

Thirteenth Day of July, 2004

JON W. DUDAS
*Acting Director of the United States Patent and Trademark Office*